Oct. 31, 1933.　　　　W. MOSCHEL　　　　1,933,499
PROCESS FOR PRODUCING ANHYDROUS MAGNESIUM CHLORIDE
Filed Sept. 13, 1929
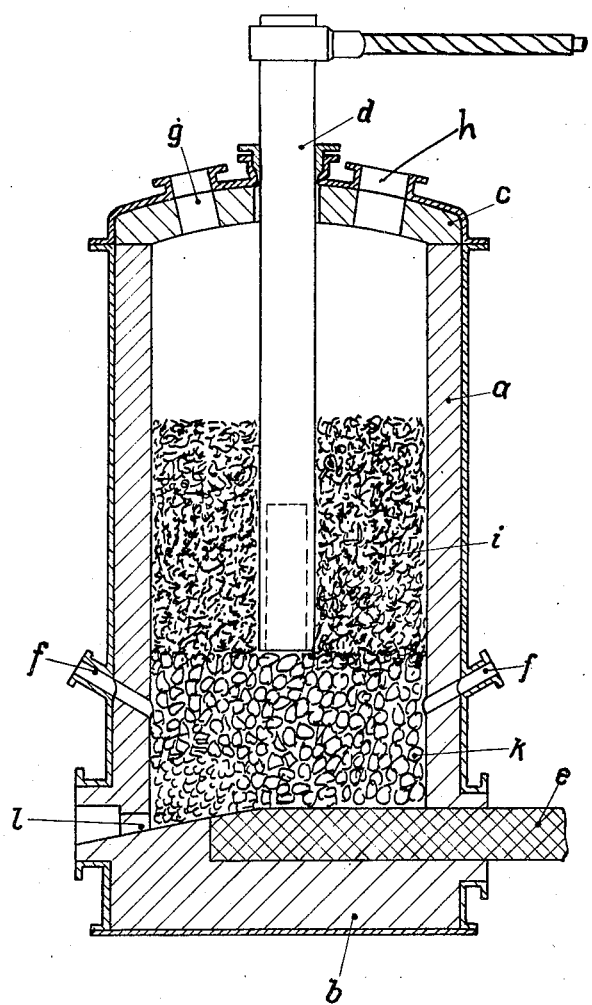
Inventor:
Wilhelm Moschel,
by Byrnes, Townsend & Brickenstein,
Attorneys.

Patented Oct. 31, 1933

1,933,499

UNITED STATES PATENT OFFICE 1,933,499

PROCESS FOR PRODUCING ANHYDROUS MAGNESIUM CHLORIDE

Wilhelm Moschel, Bitterfeld, Germany, assignor, by mesne assignments, to Magnesium Development Corporation, a corporation of Delaware Application September 13, 1929, Serial No. 392,462, and in Germany October 4, 1928

5 Claims. (Cl. 23—91)

This invention relates to a process for the preparation of anhydrous magnesium chloride free from oxide.

Numerous processes are already known for the preparation of anhydrous magnesium chloride from magnesite, carbon and chlorine. The readiest method, namely that of using pieces of crude magnesite and decomposing a mixture of crude magnesite and pieces of carbon at high temperature with chlorine has hitherto proved to be impracticable. Thus, if the decomposition be carried out at temperature below the melting point of magnesium chloride, the result is that the decomposition is entirely confined to the surfaces of the pieces of magnesite, whilst decomposition above the melting point always produces a magnesium chloride highly contaminated with magnesium oxide and useless for further employment, for example for electrolytic purposes. Consequently, it hitherto was considered indispensable first to grind the magnesite completely to powder, then to mix it with a carbonaceous substance, and to subject the product thus obtained, after suitably shaping it, to a chlorinating treatment.

An investigation has shown that the failure attendant upon the chlorination of pieces of crude magnesite above the melting point of magnesium chloride is due to the fact that the fused magnesium chloride formed contains in solution some still unchlorinated magnesium oxide, with the result that the melting point is raised considerably and the magnesium chloride assumes a pasty condition. Eventually the product rapidly solidifies even at the high reaction temperatures encountered, and forms a crust round the pieces of magnesite still containing oxide, thus bringing the reaction to a standstill.

It has now been found that it is possible, by taking these peculiar circumstances into due consideration, to work up crude magnesite in a technically satisfactory manner into anhydrous magnesium chloride free from oxide. This is effected, according to the present invention, by a special arrangement which provides for passing chlorine gas in uniform distribution into a loose mixture of pieces of magnesite and pieces of carbon (advantageously, wood charcoal or peat charcoal) at temperatures above the melting point of magnesium chloride and for immediately removing the fused magnesium chloride formed, substantially in the direction opposite to that of the current of chlorine, thus avoiding as far as possible contact between the magnesium chloride and the untreated solid mixture.

In this way, contamination of the chloride formed with untreated oxide is practically entirely prevented and as, consequently, no increase of melting point occurs, the magnesium chloride formed is a mobile liquid which can be separated from the untreated mixture without difficulty.

Another result of the process is that the chlorination can be carried out until the individual pieces of magnesite are completely consumed, since, owing to the rapid separation of the liquid magnesium chloride formed trickling off from the pieces of magnesite, the latter continually present fresh surfaces to the chlorinating action.

The method of carrying out the invention, hereinafter described, has proved to be advantageous in practice:—

A mixture of pieces of magnesite and pieces of wood charcoal or peat charcoal is placed on an electrically heated pervious layer of carbon and is there caused to react at a temperature of 700–900° C., with chlorine which is for the purpose of uniform distribution, best passed through this layer of carbon from below. The resulting magnesium chloride fuses immediately, runs through the heated layer of carbon, and collects in its lower portion from whence it can be withdrawn from time to time in the fused state and in an anhydrous and oxide-free condition. The reaction itself furnishes sufficient heat to maintain the temperature necessary for the reaction and it is consequently sufficient once and for all merely to preheat the reaction material to the necessary temperature. This preheating may be effected either by feeding in preheated material or by introducing suitable heating elements into the reaction material. Preferably, the lower portion of the current lead, passed from above through the reaction material, for electrically heating the layer of carbon is in the form of a heating element e. g., a carbon rod or carbon tube; if necessary, a plurality of current leads (three phase current heating) can be employed.

The pervious heated layer of carbon situated beneath the reaction material and acting as a sieve serves to enable the liquid magnesium chloride formed to be run off rapidly. It is therefore advantageously formed of rather coarse pieces of a mechanically resistant carbon that is electrically conductive and chemically inert—for example, fragments of hard carbon electrodes.

In order more clearly to understand the invention reference is made to the accompanying drawing which shows diagrammatically and by way of example one embodiment of apparatus suitable for carrying out the invention.

In said drawing $a$ indicates a closed shaft which is lined with fire-proof brickwork $a$, $b$, $c$. The shaft is filled for about one third of the way up with coarse-grained carbon $k$ which constitutes the pervious layer of carbon. The electric current is supplied through the leads $d$ and $e$. The upper lead $d$ has its lower portion in the form of a tube for the purpose of effecting owing to increased resistance the heating up of the reaction material $i$, a mixture of magnesite and pieces of reactive charcoal, lying upon the layer $k$. The chlorine is passed into the layer $k$ through the pipes $f$ and the reaction material is fed in at $g$. An opening $h$ serves for the removal of the waste gases. The finished magnesium chloride collects in the bottom portions of the layer $k$ and is from time to time run off at $l$ in the liquid state.

It is obvious that any other suitable method of heating the layer of carbon, such as for example by three phase current with the carbon bed as neutral conductor, can be employed. Moreover $Mg(OH)_2$ or $MgO$ may be employed instead of magnesite.

The advantage of the process as compared with all prior processes consists in the fact that naturally occurring raw material can be converted, by simple means and without costly preliminary treatment, into an anhydrous oxide-free magnesium chloride which is suitable for all purposes.

I claim:

1. A process for producing anhydrous magnesium chloride which comprises arranging a preheated loose unbonded mixture of crude pieces of magnesite and of charcoal above a heated layer of coarse pieces of mechanically resistant and chemically inert carbon, passing chlorine through said carbon layer into said mixture at a temperature above the melting point of magnesium chloride, and withdrawing molten magnesium chloride from a lower level of said carbon layer.

2. A process for producing anhydrous magnesium chloride which comprises arranging an electrically preheated unbonded loose mixture of crude pieces of magnesite and of charcoal above an electrically heated layer of coarse fragments of carbon electrodes, passing chlorine through said carbon layer at a temperature above the melting point of magnesium chloride, and withdrawing molten magnesium chloride from a lower level of said carbon layer.

3. A process for producing anhydrous magnesium chloride which comprises arranging a loose unbonded mixture of crude pieces of magnesite and of carbon above a heated pervious layer of chemically inert material, passing chlorine through said pervious layer into said mixture at a temperature above the melting point of magnesium chloride, and withdrawing molten magnesium chloride from a lower level of said pervious layer.

4. A process for producing anhydrous magnesium chloride which comprises arranging a heated loose unbonded mixture of crude pieces of magnesite and of carbon above a heated pervious layer of chemically inert material, passing chlorine through said pervious layer into said mixture at a temperature above the melting point of magnesium chloride, and withdrawing molten magnesium chloride from a lower level of said pervious layer.

5. A process for producing anhydrous magnesium chloride which comprises arranging a loose unbonded mixture of crude pieces of magnesite and of carbon heated to a temperature between about 700° and about 900° C. above a heated pervious layer of chemically inert material, passing chlorine through said pervious layer into said mixture at a temperature above the melting point of magnesium chloride, and withdrawing molten magnesium chloride from a lower level of said pervious layer.

WILHELM MOSCHEL.